(12) United States Patent
Jordan et al.

(10) Patent No.: US 6,234,906 B1
(45) Date of Patent: May 22, 2001

(54) AIRBOAT TRANSMISSION VIBRATION DAMPENER AND ASSOCIATED METHODS

(76) Inventors: W. Bishop Jordan, 245 Quayside Cir., Maitland, FL (US) 32751; Louis A. Bell, 1727 Exeter Dr., Rockledge, FL (US) 32955

( * ) Notice: Subject to any disclaimer, the term of this patent is extended or adjusted under 35 U.S.C. 154(b) by 0 days.

(21) Appl. No.: 09/312,439

(22) Filed: May 14, 1999

(51) Int. Cl.[7] ........................................... F16B 3/56
(52) U.S. Cl. ........................ 464/93; 464/92; 464/88
(58) Field of Search .................... 464/92, 93, 137, 464/88, 87, 51, 71, 70, 72, 98, 147

(56) References Cited

U.S. PATENT DOCUMENTS

| | | | |
|---|---|---|---|
| 2,778,663 | * | 1/1957 | Prevost .................................... 403/19 |
| 4,155,266 | * | 5/1979 | Bradley ............................... 74/606 R |

FOREIGN PATENT DOCUMENTS

| | | | |
|---|---|---|---|
| 2084292 | * | 4/1982 | (GB) ....................................... 464/71 |
| 2235034 | * | 2/1991 | (GB) ....................................... 464/93 |
| 580443 | * | 1/1994 | (GB) ....................................... 464/92 |
| 62-118120 | * | 5/1987 | (JP) ........................................ 464/73 |

* cited by examiner

*Primary Examiner*—Lynne H. Browne
*Assistant Examiner*—Aaron Dunwoody
(74) *Attorney, Agent, or Firm*—Allen, Dyer, Doppelt, Milbrath & Gilchrist, P.A.

(57) ABSTRACT

A vibration dampener for reducing vibration transmitted between an airboat engine and a downstream propulsion component and further for reducing a noise level created by an airboat includes a dampening plate constructed of an elastomeric material that has vibration-dampening characteristics. Sandwiched about the perimeter of the dampening plate is an outer pair of annular connecting plates connectable to the engine flywheel. Sandwiched about the dampening plate, within and in spaced relation from the outer pair of connecting plates, is an inner pair of connecting plates. The inner pair is connectable to a drive shaft leading to an airboat transmission. The vibration dampener serves to increase efficiency and part wear characteristics significantly.

13 Claims, 2 Drawing Sheets

AIRBOAT TRANSMISSION VIBRATION DAMPENER AND ASSOCIATED METHODS

BACKGROUND OF THE INVENTION

1. Field of the Invention

The present invention relates to vibration dampening mechanisms and, more particularly, to vibration dampeners for airboat propulsion systems.

2. Description of Related Art

Airboats are designed to be driven at high speeds over water and land and to have a high degree of mobility. Either an aircraft or automobile engine may be used to drive either a single propeller or a pair of counter-rotating propellers at rotational velocities in the range of 1000–5000 rpm. The transmissions employed may be either belt-driven or gear-based.

A typical structure for an airboat propulsion system comprises an engine, to which is affixed a flywheel that is rotated by the crankshaft when the engine is running. The flywheel in airboats previously known in the art is then affixed to the fore end of the drive shaft, which extends in an aft direction from the flywheel and imparts rotational motion to the transmission. Normal engine vibration, which is in part caused by the nature of the reciprocal engine, is also transmitted along the drive shaft, and causes wear on the transmission elements and other downstream components, decreasing their useful life. It would thus be desirable to damp such vibration downstream of the engine. Such vibration also increases the noise produced by airboats, which is a significant detriment to their use.

SUMMARY OF THE INVENTION

It is therefore an object of the present invention to provide an airboat vibration dampening system for reducing vibration downstream of the engine and noise produced by the airboat.

It is a further object to provide such a vibration dampening system for reducing wear on the airboat transmission.

It is another object to provide a method of reducing the vibration experienced and noise caused by airboat components.

It is an additional object to provide a method of making a vibration dampening element.

A further object is to provide a vibration dampening system for coupling a pair of rotating engine components.

These and other objects are achieved by the vibration dampening element, system, and methods of the present invention.

The vibration dampener comprises a dampening plate made of an elastomeric material that has vibration-dampening characteristics. In a particular embodiment, an outer pair of connecting plates is affixed about a perimeter of the dampening plate, with the dampening plate sandwiched therebetween. These outer connecting plates have means for connecting to an element rotationally drivable by an engine, such as the engine flywheel. Each of the outer connecting plates has a central hole therein.

Also in the particular embodiment, an inner pair of connecting plates is affixed with the dampening plate sandwiched therebetween. Each inner connecting plate is dimensioned to reside within a corresponding outer connecting plate hole in spaced relation from the outer connecting plate, ensuring that no vibration is transmitted directly between the inner and the outer connecting plates. This vibration dissipation is believed to significantly increase the lifetime of airboat components, reduce noise, and improve efficiency. For example, it is estimated that transmission lifetime is enhanced by a factor of 3–4. The inner connecting plates also have means for connecting to an element adapted for transmitting a rotational motion to a transmission, such as the drive shaft.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
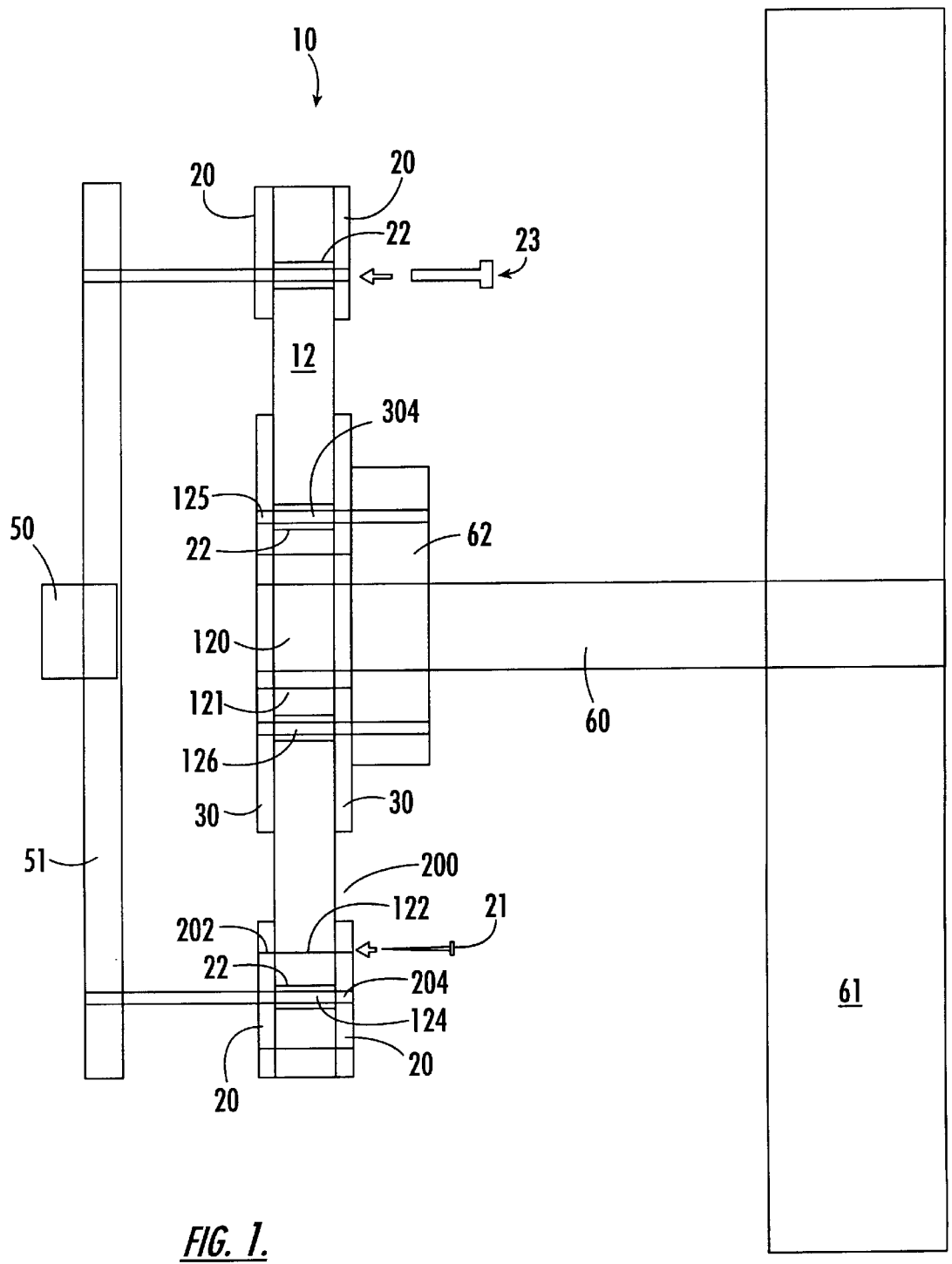
FIG. 1 illustrates a side cross-sectional view of the vibration dampener affixed to an engine for driving an airboat.
Figure 2:
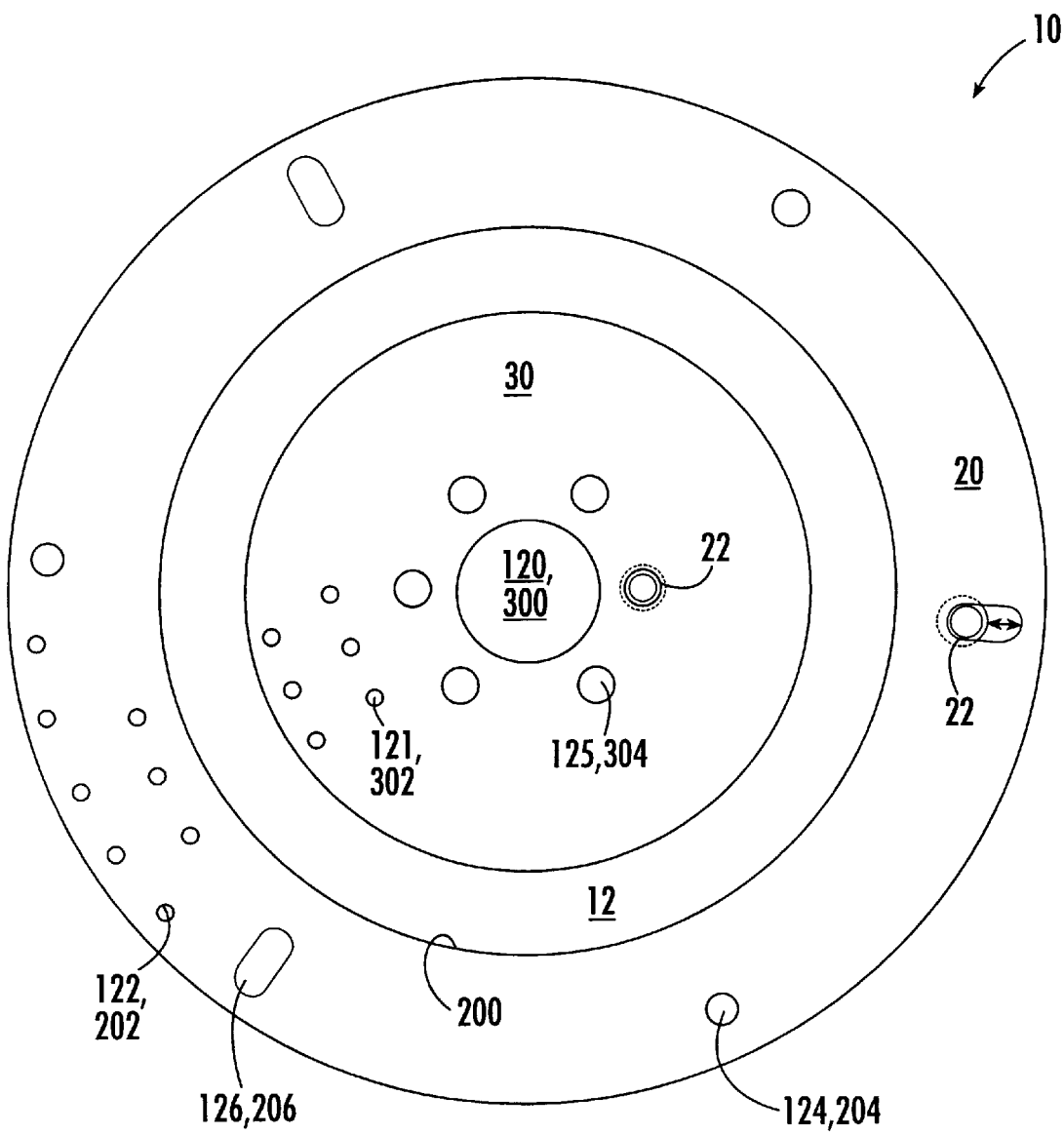
FIG. 2 is a plan view of an embodiment of the vibration dampening plate.

A description of the preferred embodiments of the present invention will now be presented with reference to FIGS. 1 and 2.

A particular embodiment of the invention is described herein as an airboat vibration dampener 10, which is shown from the side in FIG. 1, as connected to the engine's crank shaft 50 and drive shaft 60, and in plan view in FIG. 2. It is to be understood, however, that the invention is useful for dampening vibration between any pair of rotating components such as, but not limited, to those that are found in engines.

The vibration dampener 10 in the preferred embodiment comprises a generally annular dampening plate 12 having a generally central axial shaft bore 120 therethrough. A plurality of rivet holes, comprising a inner set 121 and an outer set 122 of rivet holes, are disposed about inner and outer section, respectively, of the dampening plate 12. A plurality of outer bolt holes 124 are disposed adjacent the dampening plate's perimeter; a plurality of inner bolt holes 125 are disposed adjacent the central shaft bore 120. In a preferred embodiment, at least some of the outer bolt holes 124 comprise slots 126 having a long axis disposed generally toward the shaft bore 120.

The dampening plate 12 preferably comprises an elastomeric material that has vibration-dampening characteristics, such as a polymeric material, and more preferably an ultrahigh-molecular-weight material such as Polyhigh, manufactured by Hercules Resin (PA) or American Hurst. This is not intended as a limitation, however, and other materials known in the art having similar vibration-dampening characteristics may be substituted therefor.

The vibration dampener 10 further comprises an outer pair of generally annular connecting plates 20, which are substantially identical, for affixing to a rotatable engine component such as a flywheel 51. The outer plates 20 are preferably made of a material chosen for strength and durability, typically a metal such as aluminum. They are dimensioned so that their perimeters align with the perimeter of the dampening plate 12, permitting the outer plates 20 to be affixed in sandwiching relation to the dampening plate 12.

Each outer connecting plate 20 has an axial central bore 200 therethrough. The outer connecting plates 20 and dampening plate 12 are affixed together, such as by rivets 21, through holes 202 in the outer plates 20 that correspond with the outer set of rivet holes 122 in the dampening plate 12 (only a few are shown in FIG. 2).

Each outer connecting plate 20 further has a plurality of bolt holes 204 disposed adjacent the perimeter and positionally corresponding to the outer bolt holes 124 in the dampener plate 12. Positioned within each of the dampener plate outer bolt holes 124 is a bolt guide 22, a generally cylindrical rigid member adapted for permitting a bolt 23 to pass therethrough. The bolt guides 22 are for maintaining the space between the outer plates 20, to prevent compression of the dampener plate 12 material.

In a preferred embodiment, at least some of these bolt holes 204 comprise slots 206 having a long axis disposed generally toward the central bore 200, also in alignment with the slots in the dampener plate 12. In this embodiment, the bolt guides 22 are permitted to slide along the slots 206, which permits the dampener 10 to be affixed to flywheels 51 having varying diameters and/or varying bolt patterns.

The vibration dampener 10 further comprises an inner pair of generally annular connecting plates 30, which are substantially identical, for affixing to a rotatable component such as a drive shaft 60, for communicating rotational motion to the transmission 61. The inner plates 30 are also preferably made of a material chosen for strength and durability, typically a metal such as aluminum.

The inner plates 30 are dimensioned for placement coplanar and coaxial with the outer plates 20, within the outer plates' central bore 200, in sandwiching relation to the dampening plate 12. The inner plates 30 are also dimensioned so that their perimeters are in spaced relation from the inner edges of the outer plates 20. This dimensioning and positioning prevents direct contact between the inner 30 and outer 20 plates; thus, any vibration experienced by the flywheel 51 and transmitted to the outer plates 30 must pass into the dampening plate 12, where it is substantially dissipated, before passing to the inner plates 30 and thence to the drive shaft 60 and other downstream components. Likewise, any vibration experienced by the downstream airboat elements and transmitted to the inner plates 20 must pass into the dampening plate 12 before passing to the outer plates 20 and thence to the engine components.

Each inner connecting plate 30 has an axial central bore 300 dimensioned and positioned for alignment with that 120 of the dampener plate 12. The inner connecting plates 30 and dampening plate 12 are affixed together, such as by rivets 21, through holes 302 in the inner plates 30 that correspond with the inner set of rivet holes 121 in the dampening plate 12. The central bores 120,300 are dimensioned for supporting the drive shaft 60 as it passes through its mounting bracket 62, which provides additional stability to the transmission 61.

Each inner connecting plate 30 further has a plurality of bolt holes 304 disposed adjacent the bore 300 and positionally corresponding to the inner bolt holes 125 in the dampening plate 12. As previously, positioned within each of the dampening plate inner bolt holes 125 is a bolt guide 22, a generally cylindrical rigid member adapted for permitting a bolt 23 to pass therethrough. The bolt guides 22 again are for maintaining the space between the outer plates 20, to prevent compression of the dampener plate 12 material.

It may be appreciated by one skilled in the art that additional embodiments may be contemplated, including those employing alternate fastening devices for affixing the plates together and to their respective engine and transmission components.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. An airboat vibration dampener for reducing vibration transmitted between an airboat engine and a downstream propulsion component and further for reducing a noise level created by an airboat, the dampener comprising:

a dampening plate comprising an elastomeric material having vibration-dampening characteristics;

an outer pair of connecting plates affixed about a perimeter of the dampening plate, the dampening plate sandwiched therebetween, having means for connecting to an element rotationally drivable by an engine, and each having a central axial bore therethrough; and an inner pair of connecting plates affixed with the dampening plate sandwiched therebetween, each inner connecting plate dimensioned to reside within a corresponding outer connecting plate bore in spaced relation from the outer connecting plate, having means for connecting to an element adapted for transmitting a rotational motion to an airboat transmission.

2. The airboat vibration dampener recited in claim 1, wherein:

the connecting means of the outer pair of connecting plates comprises a plurality of spaced-apart bolt holes adapted for receiving bolts for affixing to a flywheel;

the connecting means of the inner pair of connecting plates comprises a plurality of spaced-apart bolt holes adapted for receiving bolts for affixing to a drive shaft mounting bracket; and the vibration dampening plate has an inner and an outer set of bolt holes respectively aligned with the holes in the inner and the outer connecting plates for permitting bolts to pass therethrough.

3. The airboat vibration dampener recited in claim 2, further comprising a generally cylindrical, substantially rigid bolt guide disposed within each of the outer set of bolt holes in the dampening plate and dimensioned for retention between the outer connecting plates.

4. The airboat vibration dampener recited in claim 2, wherein at least some of the holes in the outer pair of connecting plates and the corresponding holes in the vibration dampening plate comprise slots having a long axis disposed generally toward a center of the dampening plate.

5. The airboat vibration dampener recited in claim 4, further comprising a generally cylindrical, substantially rigid bolt guide disposed within each slot and dimensioned for retention between the outer connecting plates, each bolt guide slidable along the slot for permitting a radial adjustment of each bolt position.

6. The airboat vibration dampener recited in claim 2, wherein the dampening plate has a generally central shaft bore coinciding with a central bore of each inner connecting plate, the central shaft bore and the inner connecting plate central bores dimensioned to receive a fore end of a drive shaft to provide support thereto.

7. The airboat vibration dampener recited in claim 1, wherein the dampener and the inner and the outer connecting plates are all generally annular in shape.

8. The airboat vibration dampener recited in claim 1, wherein the elastomeric material comprises a polymeric material.

9. The airboat vibration dampener recited in claim 8, wherein the polymeric material comprises an ultrahigh-molecular-weight polymeric material.

10. The airboat vibration dampener recited in claim 1, wherein the dampening plate is affixed to the inner and the outer pair of connecting plates with a plurality of rivets.

11. A method for reducing vibration transmitted between an airboat engine and a downstream propulsion component and further for reducing a noise level created by an airboat, the method comprising the steps of:

connecting a first element to an element rotationally drivable by an engine by affixing the first element for rotation to an engine flywheel, wherein the first element comprises an outer pair of generally annular plates, each having a central hole and having means for connecting to an engine flywheel;

connecting a second element to an element adapted for transmitting a rotational motion to an airboat transmission by affixing the second element for rotation with a drive shaft, the drive shaft in rotational connection with a propeller, wherein the second element comprises an inner pair of generally annular plates, each dimensioned for placement within an outer annular plate bore in spaced relation from the outer annular plate, the inner pair of generally annular plates having means for connecting to a drive shaft; and bridging the first and the second element with a dampening element by affixing the dampening element in sandwiched relation between each of the outer and the inner pair of generally annular plates, the dampening element adapted to prevent a direct contact between the first and the second element and comprising an elastomeric material having vibration-dampening characteristics.

12. An airboat engine for providing rotational motion for driving an airboat propeller, the engine comprising:

a reciprocating engine having a rotatable crank shaft emerging therefrom;

a flywheel affixed for rotation to the crank shaft; and a vibration dampener for reducing vibration transmitted from the engine to a drive shaft, the dampener comprising:

a dampening plate comprising an elastomeric material having vibration-dampening characteristics;

an outer pair of connecting plates affixed about a perimeter of the dampening plate, the dampening plate sandwiched therebetween, having means for connecting to an element rotationally drivable by an engine, and each having a central bore therein; and an inner pair of connecting plates affixed with the dampening plate sandwiched therebetween, each connecting plate dimensioned to reside within a corresponding outer connecting plate bore in spaced relation from the outer connecting plate, having means for connecting to an element adapted for transmitting a rotational motion to an airboat transmission.

13. A method of making an airboat vibration dampener comprising the steps of:

affixing an outer pair of connecting plates about a perimeter of a dampening plate comprising an elastomeric material having vibration-dampening characteristics, the dampening plate sandwiched therebetween, the outer pair of connecting plates having means for connecting to an element rotationally drivable by an engine, and each having a central bore therein; and affixing an inner pair of connecting plates with the dampening plate sandwiched therebetween, each inner connecting plate dimensioned to reside within a corresponding outer connecting plate bore in spaced relation from the outer connecting plate and having means for connecting to an element adapted for transmitting a rotational motion to an airboat transmission.

\* \* \* \* \*